United States Patent [19]
> Wahl et al.

[11] Patent Number: 5,061,637
[45] Date of Patent: Oct. 29, 1991

[54] PROCESS FOR THE REMOVAL AND QUALITATIVE ANALYTICAL DETERMINATION OF CYANIDE IN CONTAMINATED SOILS

[75] Inventors: Rudolf Wahl, Stuttgart; Ulrich Borchardt, Siegburg, both of Fed. Rep. of Germany

[73] Assignee: Gerling Institut Pro Schadenforschung, Schadenverhutung und Sicherheitstechnik GmbH, Cologne, Fed. Rep. of Germany

[21] Appl. No.: 539,819

[22] Filed: Jun. 18, 1990

[30] Foreign Application Priority Data

Dec. 18, 1987 [DE] Fed. Rep. of Germany ....... 3742948

[51] Int. Cl.$^5$ ............................................ G01N 33/00
[52] U.S. Cl. .................................... 436/109; 436/175; 436/181
[58] Field of Search ................. 436/109, 25, 181, 175, 436/25

[56] References Cited

FOREIGN PATENT DOCUMENTS 0161698 11/1985 European Pat. Off. .
84/046788 1/1984 World Int. Prop. O. .

OTHER PUBLICATIONS

Mussann, "Analysen für den Umweltschutz", Draegerheft, 325, 18 (1983).

*Primary Examiner*—Robert J. Warden
*Assistant Examiner*—Lyle A. Alexander
*Attorney, Agent, or Firm*—Wegner, Cantor, Mueller & Player

[57] ABSTRACT

The process for the removal and qualitative analytical determination of cyanide in cyanide-contaminated soils consists of introducing biologically degradable organic acids into the soil while blowing a gas stream therethrough and subsequently oxidizing the hydrocyanic acid liberated thereby, until no hydrocyanic acid and nor ammonia are detectable in the emerging gas stream. Preferably, the process is carried out by blowing carbon dioxide and compressed air into said soil. The process is also suitable for indirectly detecting pollutants associated with cyanide.

12 Claims, No Drawings

PROCESS FOR THE REMOVAL AND QUALITATIVE ANALYTICAL DETERMINATION OF CYANIDE IN CONTAMINATED SOILS

This application is a continuation-in-part of International Application PCT/EP88/01148, filed Dec. 13, 1988.

BACKGROUND OF THE INVENTION

Subject matter of the present invention is a process for removing cyanide from cyanide-contaminated soils' and a method of qualitative analysis of cyanide in potentially or actually cyanide-contaminated soils based thereon.

In the course of the discovery of contaminated locations, for example by establishing land registers of places polluted in the past, but also upon occurrence of new contaminations of the soil by industrial accidents, cyanide-contaminated soils are encountered to an increasing extent. Mainly these contaminations have been caused by galvanization and electroplating plants; however this problem is also encountered in all places where larger amounts of cyanides have been handled.

In the past the problem has been solved by digging such contaminated soils out and committing them to toxic waste dumping grounds. This procedure is extremely expensive and difficult to carry out to an increasing degree, since the space available in dumping grounds for toxic waste is extremely restricted and will be even less available in the future. The problem becomes even more difficult and costly, if the involved soil is under or immediately adjacent to buildings, since digging the soil out may endanger the structural safety of the buildings. Thus, in extreme cases even a demolition of the respective buildings had to be contemplated.

Thus, the first object was to develop a process whereby the cyanide could be removed from contaminated soils, where a removal on-site or off-site could be useful in order to avoid the transportation to the toxic waste dumping ground. However, preferably the process should be feasible in situ as well in order to avoid the costs of excavation and the exposure to structural danger to the adjacent buildings.

It has been known to detoxify cyanide waste waters according to various methods, all of which, however, employ relatively concentrated solutions, and wherein the processes can be carried out in more or less sealed containers. Thus, for example, there has been known the detoxification with hypochlorite wherein, in an exothermic reaction, first cyanogen chloride is formed which is also toxic and which can be hydrolyzed at pH values in excess of 12 and be converted into cyanate and finally ammonium carbonate. In addition, this process is a problem if in the waste water there are present not only free alkali cyanides but also heavy metal cyanide complexes, since the latter prevent or at least severely slow down the reaction of the cyanide. Further known is the detoxification with perchemicals, and more specifically with Caro's acid or $H_2O_2$. These procedures are particularly well suited for relatively concentrated cyanide solutions. Since at room temperature the reaction with hydrogen peroxide proceeds only very slowly the reaction must be carried out either at an elevated temperature or by using catalysts. As the catalysts there are added especially copper salts in amounts of 0.2 g/l of copper sulfate.

In two further processes, formaldehyde and $H_2O_2$ or ozone are introduced. Both processes will work only at relatively high concentrations, are relatively expensive and are also not free from problems because of the toxicity of the chemicals.

A further known process is the oxidation with the oxygen of the air in the carbocyanide process. Therein, the cyanide solution is passed through a column charged with certain kinds of activate carbon, while at the same time air is introduced. In this process, part of the cyanide is reacted to form cyanate, and part of the cyanide is reacted to form nitrogen. The cyanate may be subsequently saponified to give ammonia and carbonic acid. This catalytic oxidation is only incompletely accomplished with nickel complexes and cannot be successfully achieved at all with iron complexes.

Also known is the oxidation of hydrocyanic acid in the gaseous state, and more specifically in the case of concentrated cyanide solutions. In the course thereof, the concentrated cyanide solution is reacted with strong acids—optionally waste acids as well. The liberated hydrocyanic acid is then stripped from the solution with a carrier gas and is passed to the oxidation. This process can be carried out only in a closed system and under greatest precautions. It has so far not proven to be useful in practice.

Hydrolysis of cyanides has already been carried out under catalytic conditions by passing the mixture of hydrocyanic acid and air over a noble metal contact, at which combustion occurs of hydrocyanic acid to produce carbon dioxide, nitrogen and water. In the presence of a less than stoichiometric amount of oxygen, carbon monoxide, nitrogen and water are formed as well. The heat of combustion of this process may be simultaneously employed for heating the solution to be detoxified. This process certainly is also not suitable for the detoxification of contaminated soils. Also hydrolysis of cyanide in an autoclave at temperatures of from 180° C. to 200° C. for the removal of salts used in hardening operations is not feasible for a detoxification of soils.

The removal of cyanides by precipitation as Berlin White or Berlin Blue makes it necessary to dispose of the precipitation products in a special waste dumping ground or to consign them to a specialized plant for the workup. Thus, these processes certainly are also not suitable to work up cyanide contaminated soils. A compilation of all of these techniques is found in company brochures by the company Degussa, "CYANIDE, Entgiftung cyanidischer Abwässer—eine Übersicht über gängige Verfahren" as well as "CYANIDE—Entgiftung cyanidischer Abwässer mit Persauerstoff-Verbindungen".

SUMMARY OF THE INVENTION

It was now surprisingly found that it is possible to detoxify cyanide contaminated soils by introducing biologically degradable organic acids into the soil while blowing a gas stream therethrough and subsequently oxidizing the hydrocyanic acid liberated thereby, until no hydrocyanic acid and no ammonia are detectable in the emerging gas stream. The cyanide, more particularly, is present in a water-soluble free or weakly complexed form.

The usable biologically degradable organic acids include formic acid and acetic acid. However, carbonic acid is particularly preferred, as it virtually does not lead to even a temporary contamination of the soil.

Furthermore, carbonic acid is available at a particularly reasonable price and is particularly easy to be technically handled in said process.

For the gas stream there are taken into consideration all gases that are available in a sufficient amount at a reasonable price such as carbon dioxide, nitrogen, steam, oxygen or compressed air. Unexpectedly, compressed air will simultaneously act as an oxidant so that after passing the organic acids through the soil and blowing compressed air through the soil, the hydrocyanic acid will already be oxidized to an increasing extent, and the emerging gas will contain only ammonia.

In a particularly preferred embodiment of the process according to the invention, simultaneously or alternately, compressed air and carbon dioxide are introduced into the soil. Then, the emerging gas stream initially contains just some hydrocyanic acid and, after an induction period, only ammonia, until in the end the ammonia level also drops below the limit of detection. A residual amount of ammonia remaining in the soil is ecologically acceptable.

More particularly, to solve the problem of the hydrocyanic acid release in the beginning, it is possible to collect the emerging gas stream and recycle it into the soil until no hydrocyanic acid is detectable any more.

The detection of hydrocyanic acid and/or ammonia in the emerging gas stream can be effected, for example by means of the indicator test tubes of the company Dräger which are designed for and capable of detecting contaminations of hydrocyanic acid and ammonia in the emerging gas stream with sufficient accuracy.

It is a particular advantage of the process according to the invention that it is suitable not only for the treatment of the dug-out material in the so-called on-site or off-site processes, but that it can be carried out also in situ, that is without previously digging out the contaminated soil material.

At the same time the process according to the invention allows to trace cyanide in contaminated soils by way of a qualitative analysis. To this end, by means of a screening or locally oriented withdrawal system, aeration system or venting system, such as a lance or drain system, a biologically degradable organic acid is introduced into the potentially or actually decontaminated soil sample while simultaneously blowing a gas stream through said soil sample, and the hydrocyanic acid liberated thereby is oxidized immediately thereafter and then detected in the emerging gas stream either as hydrocyanic acid or as ammonia. If the method is employed for recognizing cyanide-containing soil materials, then it is sufficient to enrich the soil within the region of the supposed contamination with the biologically degradable organic acid under oxidative conditions, up to saturation. Then in a sample the cyanide is detected as hydrocyanic acid and/or ammonia. If the emerging gas stream contains neither hydrocyanic acid nor ammonia, it may be understood that said region is not contaminated with a water-soluble or only weakly complexed cyanide. This method of detection also involves an indirect detection of all pollutants indirectly associated with the respective cyanide-containing infiltrations. For example, if the contaminations have originated from galvanization plants, and more particularly from rinse or waste waters, it is also to be presumed that heavy metal infiltrations may have occurred.

The process according to the invention is basically unable with all soils that have sufficient water and gas permeabilities. Nevertheless, soils having lower water and gas permeabilities mostly are also less endangered to become contaminated by cyanide lyes. In any event, soils having a water permeability coefficient of from $10^{-5}$ to $10^{-6}$ can still be cleaned and analyzed according to the invention.

If cyanide-containing soils will release neither hydrocyanic acid nor ammonia under the conditions according to the invention, it is to be assumed that the cyanide has been bound so firmly therein that it does not represent any hazard to ground water and other environment. However, relevant conclusive research results so far have not been available. Furthermore, it has so far not been elucidated whether under the conditions according to the invention all of the soils contaminated with cyanide are capable of fully oxidizing the hydrocyanic acid and hydrolyzing the cyanate formed thereby so that finally it is only ammonia that is analytically detectable. If desired or required, a sufficient catalyst amount of metal salts, for example iron salts could be introduced into such soils, while normally such salts will be contained in sufficient amounts in such soils. In fact, in all of the cases practiced so far such an addition was not necessary, but after a short induction period, no hydrocyanic acid but only ammonia was detected in the emerging gas stream.

DESCRIPTION OF THE PREFERRED EMBODIMENT

Some typical embodiments of the process according to the invention are illustrated in the following.

EXAMPLE 1

Used cyanide-containing baths from a galvanization plant had infiltrated into the soil by way of a defective pipeline. To mend this damage, first the soil outside the building had been dug out to such an extent that there was no danger to the structure of the building. The dug-out soil was in containers waiting to be committed to some suitable toxic waste dumping ground. The concentration of total cyanide was 103 mg/kg of soil. An eluate test carried out with this soil sample according to German test procedure, Einheitsverfahren, Chapter S 4, led to a free cyanide content of 80 mg/kg of soil. The amount of excavated material was 70 m³ altogether, 6 m³ of which were concrete and wall scraps which were also highly contaminated with cyanide-containing solutions so that they already displayed optically visible copper efflorescence. The soil was predominantly sandy (medium sand according to DIN 4022) and, thus, particularly critical with respect to leaching and poisoning of ground water. Since a suitable dumping ground for toxic Waste had not yet been found, it was attempted to salvage the excavated soil in the containers.

By means of drainage pipes laid on the bottom of the containers and later on by forcing ram probes and ram lances into the soil, it was possible to introduce various liquids and gases. Thereupon it was surprisingly observed that after the introduction of sufficient amounts of acetic acid or carbonic acid and blowing through a stream of air only in the beginning some hydrocyanic acid emerged (a maximum of 5 ppm in the free atmosphere of the covered container); after some time the content of hydrocyanic acid dropped and, instead, ammonia emerged to an increasing degree (a maximum of 100 ppm in the free atmosphere of the covered container). Thus, the hydrocyanic acid obviously had been oxidized by the oxygen of the air, and the cyanate formed thereby had been subsequently hydrolyzed.

Apparently, the large surface area of the excavated soil and the contaminations and components present therein catalytically promoted the reaction to form ammonia. From the knowledge of the detoxification of cyanide-containing waste waters, it was to be expected that such reactions would proceed only at essentially higher temperatures. Then, further tests with the containers showed that intermittently introducing carbon dioxide and compressed air into and blowing said gases through the contaminated soil reduced the content of hydrocyanic acid and ammonia in the emerging gas stream to below the limit of detection of the Dräger tubes. Further analytical investigation of the soil thus treated showed that the content of total cyanide and elutable cyanide had dropped below the initial value.

EXAMPLE 2

After the promising results obtained in the on-site procedure according to Example 1, the remaining soil material beneath and immediately adjacent to the building was treated in situ. To this end, carbon dioxide and compressed air were intermittently blown into rinse lances forced into the ground, and the emerging gas was removed by an aspirator device in the same manner as with halogenated hydrocarbons. After some days, the emerging gas stream did not contain any more traceable amounts of hydrocyanic acid and ammonia (limit of detection of Dräger tubes: each 0.5 ppm of hydrocyanic acid and ammonia, respectively). Soil samples taken by means of probes at half the distance between two locations of gas introduction showed that the amounts of total cyanide and leachable cyanide were below the admissible limits.

EXAMPLE 3

In the farther surroundings of the cyanide-contaminated ground region, further lances were introduced, and carbon dioxide and compressed air were intermittently blown therethrough. Analysis of the emerging gas showed that hydrocyanic acid and ammonia were detectable only where the direct analysis of soil samples had also shown a cyanide contamination. Thus, the process for the removal of cyanide may be used also for a qualitative analysis.

What is claimed is:

1. A process for the removal of cyanide in cyanide-contaminated soils, wherein biologically degradable organic acids selected from the group consisting of formic acid, acetic acid or carbonic acid are introduced into the soil while blowing a gas stream therethrough, and the cyanide is liberated as hydrocyanic acid which is subsequently oxidized, until no hydrocyanic acid and no ammonia are detectable in the emerging gas stream, and wherein the process does not employ alkali hypochlorite or adjust the pH of the soil to pH 11.

2. The process according to claim 1, wherein compressed air is used as the gas stream and as oxidizing agent.

3. The process according to claim 1 wherein the process is carried out in situ, on-site or off-site.

4. The process according to claim 1, wherein the emerging gas stream is collected and re-introduced into the soil until no hydrocyanic acid and ammonia is any longer detectable.

5. The process according to claim 1, wherein carbonic acid is used as the organic acid.

6. The process according to claim 5 wherein compressed air is used as the gas stream and as oxidizing agent.

7. The process of claim 1 wherein the presence of free or weakly complexed cyanides capable of being released with weak acids is detected by means of the hydrocyanic acid or ammonia liberated.

8. The process as in claim 7, wherein cyanides are detected as hydrocyanic acid and/or ammonia by means of a screen or raster-shaped aerating or venting system or withdrawal system.

9. The process according to claim 1, wherein cyanides are detected as hydrocyanic acid and/or ammonia by means of a screen or raster-shaped aerating or venting system or withdrawal system.

10. The process according to claim 9, wherein cyanides are detected as hydrocyanic acid and/or ammonia by means of a screen or raster-shaped aerating or venting system or withdrawal system.

11. The process according to claim 1, characterized in that pollutants associated with cyanides are indirectly detected.

12. The process according to claim 11, wherein cyanides are detected as hydrocyanic acid and/or ammonia by means of a screen or raster-shaped aerating or venting system or withdrawal system.

* * * * *